Sept. 27, 1960    R. A. ENGLERT    2,954,060
GRID RESHAPING
Filed Sept. 20, 1955    9 Sheets-Sheet 1

Sept. 27, 1960     R. A. ENGLERT     2,954,060
GRID RESHAPING

Filed Sept. 20, 1955     9 Sheets-Sheet 2

INVENTOR.
RALPH A. ENGLERT
BY Michael Hertz

Sept. 27, 1960  R. A. ENGLERT  2,954,060
GRID RESHAPING
Filed Sept. 20, 1955  9 Sheets-Sheet 3

INVENTOR.
RALPH A. ENGLERT
BY Michael Hertz

Sept. 27, 1960 R. A. ENGLERT 2,954,060
GRID RESHAPING
Filed Sept. 20, 1955 9 Sheets-Sheet 5

Fig. 7

INVENTOR.
RALPH A. ENGLERT
BY
Michael Hertz

Sept. 27, 1960     R. A. ENGLERT     2,954,060
GRID RESHAPING

Filed Sept. 20, 1955     9 Sheets-Sheet 6

INVENTOR.
RALPH A. ENGLERT
BY
Michael Hertz.

INVENTOR.
RALPH A. ENGLERT
BY Michael Hertz

Sept. 27, 1960  R. A. ENGLERT  2,954,060
GRID RESHAPING

Filed Sept. 20, 1955  9 Sheets-Sheet 9

INVENTOR.
RALPH A. ENGLERT

BY
Michael Hertz

United States Patent Office 2,954,060
Patented Sept. 27, 1960

2,954,060

GRID RESHAPING

Ralph A. Englert, Jersey Shore, Pa., assignor, by mesne assignments, to Sylvania Electric Products Inc., Wilmington, Del., a corporation of Delaware Filed Sept. 20, 1955, Serial No. 535,456

27 Claims. (Cl. 140—71.5)

This invention relates to grid reshaping methods and apparatus.

In the manufacture of beam power tubes, it is customary to align the grid laterals of the control and screen grids after the electron tube mount has been assembled. This has usually been effected by an operator manually, or with the aid of tweezers, adjusting the grid side rods of a grid to bring about alignment of the grid laterals as observed by sighting above or below the upper or lower edges of the anode or by observing the overlapping of the grid laterals of the two grids through a small shuttered window provided in the anode. These procedures are slow and even when parts of a grid are in alignment with parts of another grid, there is no certainty, because of the limited observation afforded the operator, that the remainder of the grids are in proper alignment.

It is an object of this invention to provide a method whereby previously wound grids may be reshaped in such a manner that alignment procedures, such as described above, will not be requisite after assembly of parts and yet the wires of the grids will be lined up.

It is a still further object of the invention to provide a machine which shall process wound grids of uniform winding and equal turns per inch so that their lateral windings shall always run at a definite angle with respect to the grid side rods and so that when the No. 1 or control grid and the No. 2 or screen grid are assembled with other parts to form a mount, the grid laterals of both grids shall be in parallelism, with laterals of the No. 1 grid in alignment, and preferably in horizontal alignment, with respective laterals of the No. 2 grid.

It is a further object of this invention to provide a mechanism to reshape wound grids so that the grid laterals on either face of the grid become parallelly aligned not only with each other but also with the grid laterals on the other face and with the grid laterals stretched and formed to remove slack therein.

These and other objects will become apparent after reading the following specification and claims in conjunction with the accompanying drawings in which:

Figures 1, 2:
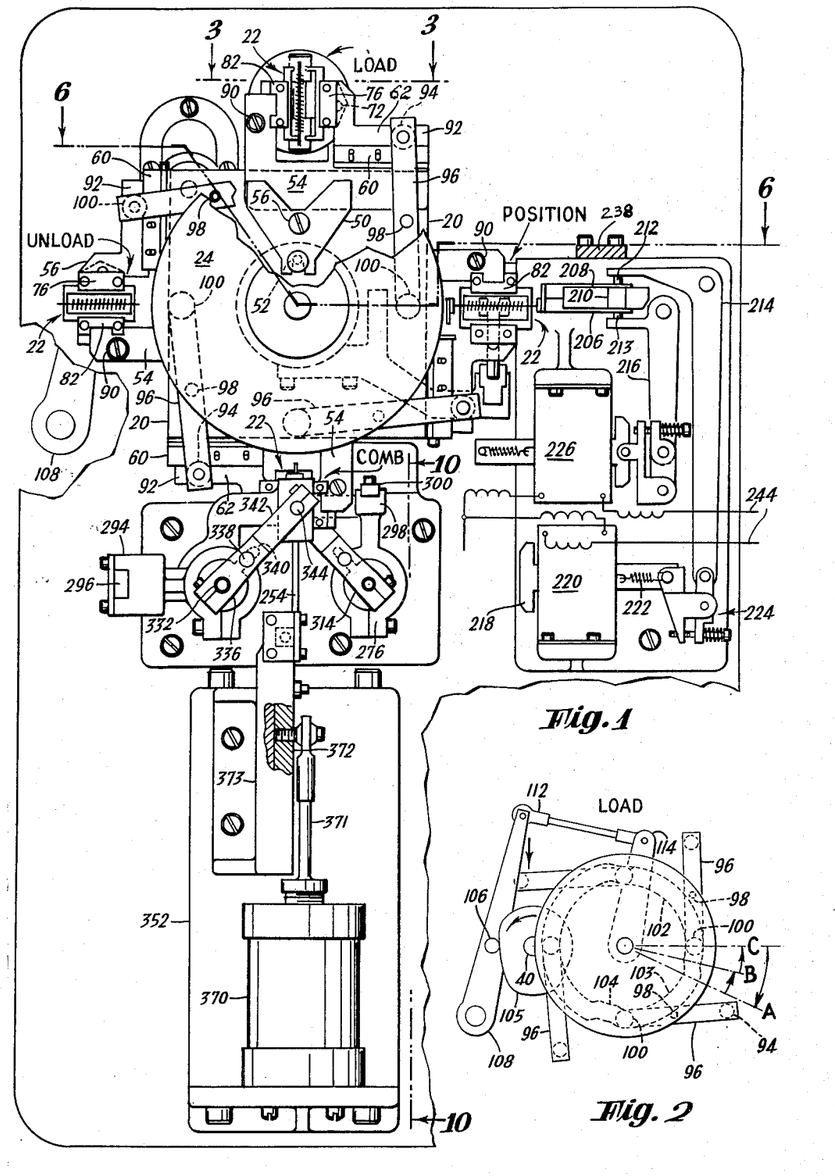
Fig. 1 is a top plan view of a wound grid processing machine, parts being broken away to expose hidden portions.
Fig. 2 is a plan view of a cam disc utilized in the apparatus showing in dotted lines the contour of the cam in the lower face of the disc.
Figure 6:
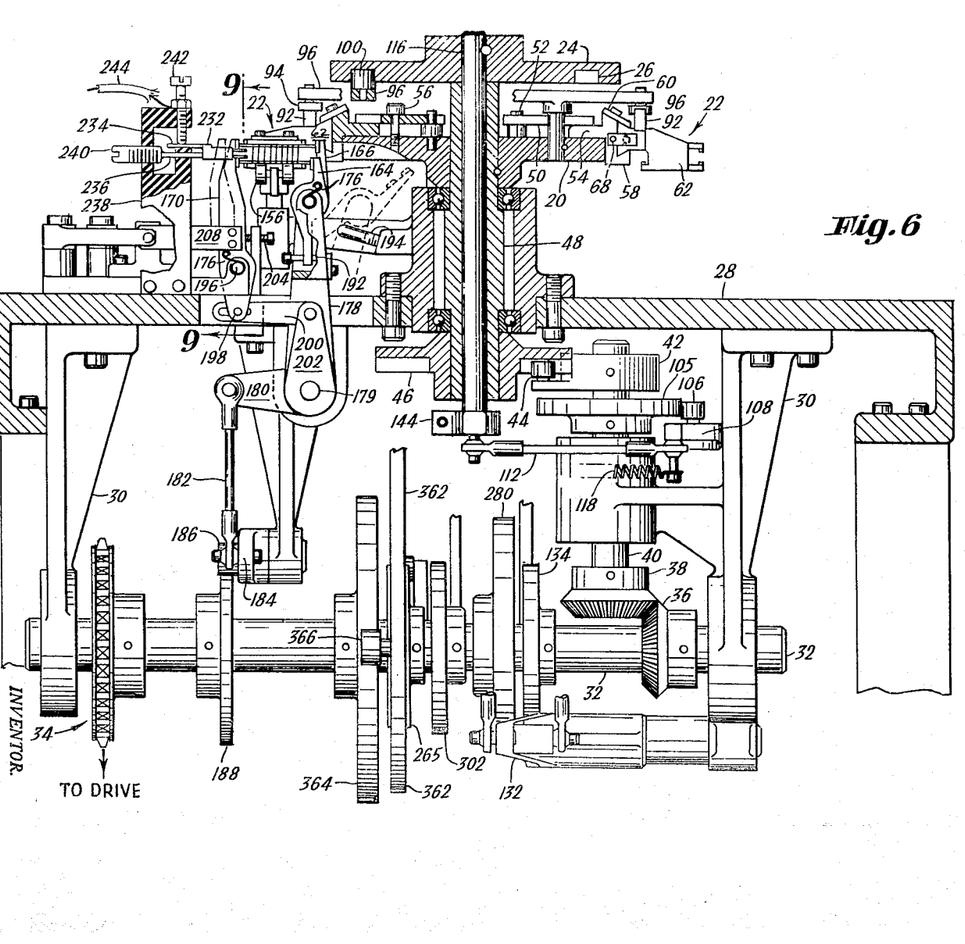
Fig. 6 is a sectional view, substantially on the line 6—6 of Fig. 1 showing the means for effecting shifting of the grid side rods to rack the grid and thereby secure proper angularity of the grid lateral wires relative to the side rods.

Referring to the drawings with greater particularity, and with particular reference to Figs. 1 and 6, it will be seen that the machine to carry out the novel process includes four stations designated as Load, Position, Comb, and Unload stations. A square turret 20 is indexed 90° for bringing grid carriers 22 successively to the above stations, there being four equally spaced carriers each extending laterally from the midportion of a side of the square turret. The turret is surmounted by an oscillatable plate or disc 24 having a cam track 26 in its underface in which track ride the cam follower equipped ends of four levers serving to operate gripping jaws of the grid carriers, as will be described. At the "Load" station a grid is placed within the carrier; at the "Position" station the two grid laterals are positioned longitudinally with respect to one another, that is to say, the grid is racked, to bring the first turn of the grid laterals to a definite angularity with respect to the grid side rods; at the "Comb" station the grid is stretched on its major diameter, by means of an expanding mandrel and the grid lateral wires on both faces of the grid are brought into parallelism; at the "Unload" station, the reshaped grid is released from the machine to be transferred to a suitable receiver.

The turret, cam and other parts are all supported by a frame or table 28 having hangers 30 supporting a main horizontal drive shaft 32 suitably driven from a motor, as by chain and sprocket drive 34. Fixed on this shaft is a bevel gear 36 meshing with a second bevel gear 38 fixed on the lower end of a vertical shaft 40 to the upper end of which is fixed the rotor 42 of a Geneva movement, which rotor carries a driving pin 44 engaging a four lobed start wheel 46 fixed to a ball bearing mounted hub 48 which in turn is fixed to the square turret 20. Thus the turret will be indexed 90° for each indexing operation.

The grid carriers 22, as shown in Figs. 1 and 6, are mounted on the turret by means of clamp bars 50, each slidably fitted at one end over a locating pin 52 and lapping over, on the other end, a bracket extension 54 on the carrier 22. A clamping screw 56 passes through the clamp bar and is screw threaded into the turret.

Figure 3:
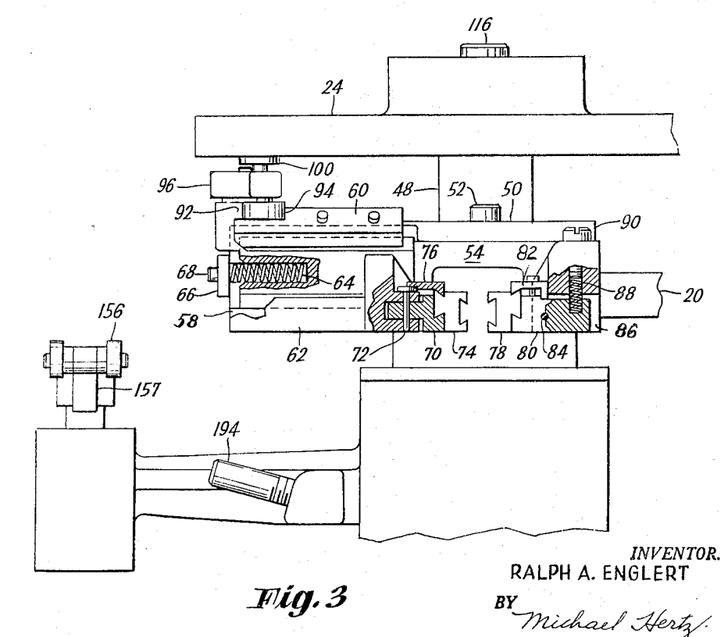
Fig. 3 is a view of a portion of the machine at a grid loading station, parts, including a grid receiving cradle, being removed and other parts broken away to expose hidden portions and looking in the direction of the arrows 3—3 in Fig. 1.

The grid carrier comprises, besides the extension 54, a lower way 58 and an upper releasable plate 60 forming between them a dovetail joint to slidably retain a grid jaw mount slide 62, see Fig. 3. The jaw mount is urged to the right, in Fig. 3, by a spring 64 seated in a pocket in the jaw mount and reacting against a stop plate 66 removably secured to lower way 58 by a screw 68 or the like. The mount 62 pivotally supports a jaw block 70 by a vertical pivot pin 72. The jaw block has associated with it an exchangeable grid engaging jaw 74, a different jaw being used for a different sized or shaped grid. A releasable clamp plate 76 cooperates with the jaw block to hold the grid engaging jaw 74 in position.

The jaw 74 and its support jaw block 70, it will be noted, are free to pivot in a horizontal plane through a limited arc about the vertical pivot pin 72 and are free to move back against the force of spring 64. These motions allow the jaw 74 to accommodate itself to some irregularities of a grid positioned between this jaw and a second cooperating grid engaging jaw 78. This jaw, like its companion jaw is held in a jaw block 80 by means of a releasable clamp plate 82 for exchange with another jaw, said jaw block being mounted for limited pivotal movement about a horizontal pin 84 which pin is within a portion 86 integral with the bracket 54. A light spring 88 held in a pocket in the portion 86 by means of a cap screw 90 reacts against the tail of the jaw block 80 and normally holds the grid engaging jaw 89 tilted slightly upwardly. The pivoting of the block 80 about a horizontal axis, the pivoting of the companion block 70 about a vertical axis and the lateral movement of the left hand jaw, as viewed in Fig. 3 enable the grid receiving jaws to adapt themselves to slight irregularities of the grid side rods received between them.

Each laterally displaceable jaw mount slide 62, see Figs. 1, 2, 3, and 6, has an upwardly extending projection 92 in position to be engaged by a roller 94 on the end of a lever 96 of the first class pivoted on the turret as at 98 and having a roller 100 at the other free end riding in the cam track 26 (see Fig. 2) in the under surface of the disc or plate 24. The cam track 26 is generally circular in outline, but it has an inset portion 102 or one of shorter radius of curvature for about one quarter of its circumference, a portion 103 of larger radius of curvature, and a short inset portion 104 at a point about 180° displaced from the start of the inset portion 102. The remainder of the track has no inset portion. The reasons for these inset portions will be made clear further on.

Now referring to Figs. 2 and 6, it will be seen that shaft 40 has mounted on its upper end a cam 105, with which cooperates a follower roller 106 on a lever 108 pivoted to a fixed portion of the machine at one end and to a link 112 at its otherwise free end. The other end of the link 112 is pivoted to a crank arm 114 fixedly clamped to a shaft 116 rotatively mounted in the hub 48, the shaft at its upper end being pinned to the disc 24. A spring 118 operates between the lever 108 and a fixed portion of the machine frame to maintain the follower roller 106 against the cam 105. The cam 105 is contoured so that in one rotation of the same, the disc 24 will make two distinct forward equal angular movements from A to B and from B to C and then one return angular movement from C to A. Because of these forward movements, and the contour of the track of the carriers 22 in the loading, grid lateral positioning, and grid unloading position will be opened, as will be explained in greater detail, but the grid holding jaws at the grid combing station will always remain closed since there is no offset in the cam track 26 to operate the roller 100 on the lever 96 corresponding to the carrier at the combing station. After an operation has taken place at each of the four stations around the turret, the turret indexes, carrying with it the four levers 96. The rollers 100 on these levers then ride in the arcuate portions of the track 26 so that the grid holding jaws whether open or closed are not moved relatively to one another. It is during the indexing movement of the turret that the disc 24 is quickly oscillated backwardly from C to A. Since the rollers 100 are then moving away from the breaks in the track 26, the grid holding jaws are still not moved relative to each other. During indexing, all of the carriers 22 are closed except the carrier moving from grid unloading to grid unloading station. The jaws of this carrier remain open because the cam track is here at its smallest radius of curvature.

Figure 4:
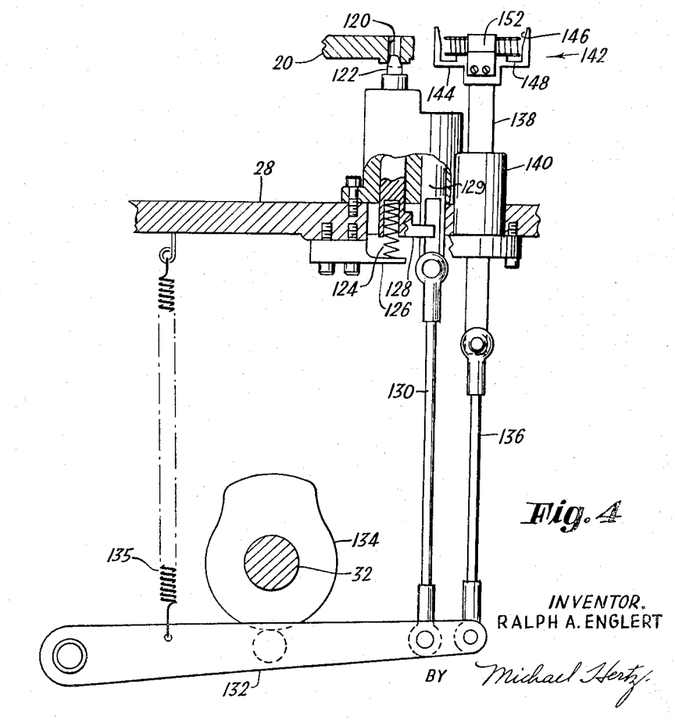
Fig. 4 is a side view of the grid receiving cradle with portions adjacent thereto and also operating mechanism therefor.

To center the turret at its rest positions, it is provided with four centering holes, one of which is shown in Fig. 4 at 120, these holes cooperating, in turn, with a conical locking pin 122, thrust upwardly into a hole by a spring 124 reacting between a pocket in the lower end of the pin and a removable abutment 126 on a fixed portion of the machine frame. To pull the pin out of locking engagement, the same is provided with a lateral projection 128 having a pin and slot engagement with a slide link 129 articulated with an operating rod 130 pivoted at its lower end to a lever 132 pivoted to the frame, said lever having a follower riding on a cam 134 fixed on the shaft 32 and being kept against the cam by a spring 135 tensioned between the lever 132 and a fixed part of the frame.

Figure 5:
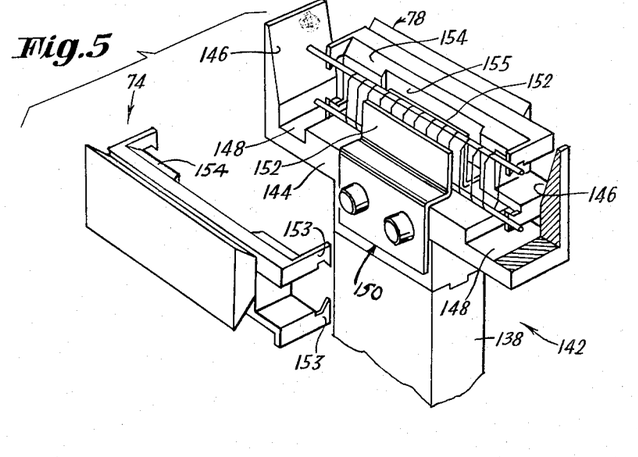
Fig. 5 is an exploded view of the cradle.
Figure 7:
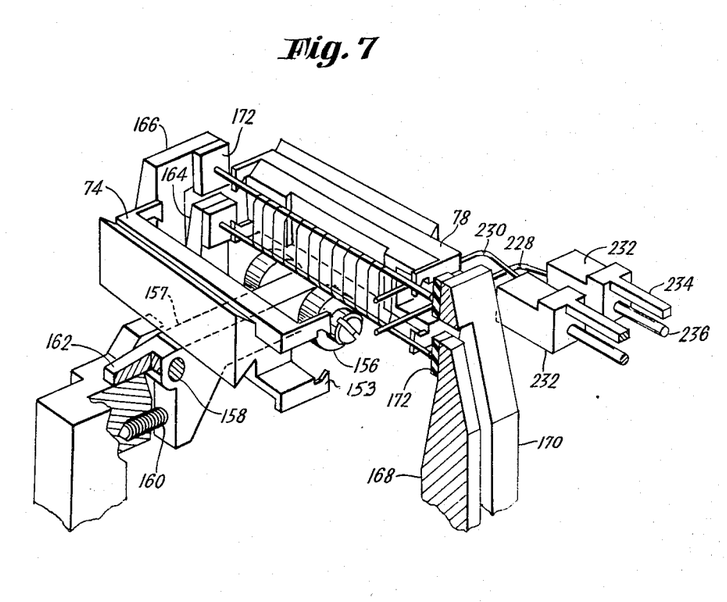
Fig. 7 is an enlarged and exploded view of a portion of the mechanism of Fig. 6.

Also pivotally mounted on the lever 132 is a cradle operating rod 136 linked to a bar 138 guided for vertical reciprocable movement in a fixed bearing 140 and carrying at its upper end a cradle 142 for temporarily positioning and supporting a grid preparatory to the grid being grasped by the turret grid holding jaws. The cradle is shown in detail in Fig. 5. It comprises a generally U-shaped bar 144 mounted on the bar 138 and provided with grid insertion guiding bevelled ends 146, and a recessed portion 148 to accommodate the grid holding jaws in the bight of the U. Mounted on each lateral wall of the bar is a double angled plate 150 with two portions 152, 152 facing each other with a space therebetween into which a grid may be dropped by any suitable dispensing means. After a grid has been dropped in between the portions 152 and preliminarily guided into position by the bevelled ends 146, the grid engaging jaws 74, 78 move in to engage the side rods of the grid. The recesses 148 allow freedom of motion of the jaw fingers 153 which engage the grid side rods and at least one of the jaws has bevelled edges 154 cooperative with the bevelled ends 146 to guide the grid in place and also recesses 155 to accommodate the plate 152. In Fig. 7 only one jaw has the bevel and recess since the fingers 153 may be made long enough to provide the necessary clearance when the fingers engage the grid side rods.

Parts are so timed that as the turret indexes to loading position with the jaws open, spring 135 causes the cradle to rise quickly as the cam 134 recedes from the lever 132. As the cradle reaches its upper position, a grid is dropped thereinto and then by reason of oscillation of disc 24 from position A to B, the roller 100 at the loading position will ride into the section 103 of the track. By reason of lateral displacement of the roller, the jaw fingers will be released for closure on the grid side rods. Now the cam 134 depresses the cradle and also the locking pin 122 and the turret 20 indexes to bring the grid engaging jaws from the loading position to the grid lateral aligning position. Prior to indexing, the disc had moved through the angle between B and C, but this had no effect on the roller 100 at the "Load" station although it did have an effect at the next station, as will be described. At the end of the indexing motion the locking pin 122 again becomes effective to lock the turret, and the cradle rises to receive and locate another grid. During the indexing of the turret, the disc moves back through the angle from C to A.

At the grid lateral aligning station means are provided to ensure that the end lateral turn will always have the same inclination to the grid side rods when the latter are held immovable in the grid engaging jaws. The means for bringing this about is shown in detail in Figs. 1 and 6 to 9.

As the carrier reaches the positioning station, the roller 100 which was previously at the load station will get very close to inset 104. The jaws are subsequently opened by reason of oscillation of the plate or disc 24 through the angle from A to B. This permits the grid to be loose between the jaws. The grid is prevented from dropping out by reason of a bottom support in the form of a pair of rollers 156 mounted on a cantilever 157 pivoted at 158 and lightly pressed upwardly by a spring 160 reacting between a tail on the lever and a fixed abutment, the lever also being provided with a stop finger 162 engaging a fixed abutment to prevent undue upward motion of the grid when released from the jaws. A grid when moving to positioning location of the turret may depress the rollers 156, but once the jaws release the grid, the grid will move to proper elevated position by action of the spring 160 and finger 162. In Fig. 7, for the sake of clarity, one of the jaws is shown as far removed from the grid. In actuality, the machine moves the jaw 74 just far enough away from the grid side rods to permit one or both of the side rods to be shifted longitudinally of themselves.

Figure 8:
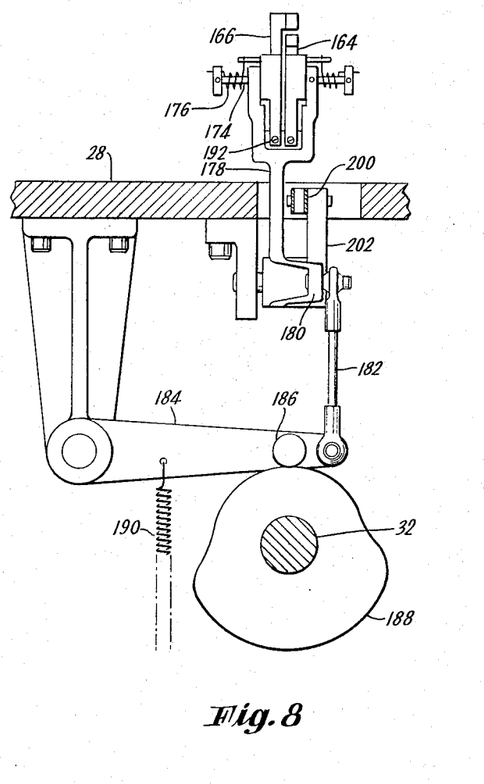
Fig. 8 is an end view of fingers forming part of the side rod shifting means and operative means therefor.

The means for shifting the side rods and thus racking the grid include four fingers 164, 166, 168 and 170. All of the fingers are provided with grid side rod engaging resilient pads 172. Consider first the fingers 164 and 166. These fingers, see Figs. 7 and 8, are side by side, both being rotatably mounted on a common pivot pin 174 and spring pressed counterclockwise, as viewed in Fig. 6, by light springs 176, one for each finger. The padded ends of the fingers are shaped to overlie one another, one being of a length to engage the end of the lower side rod of a grid and the other being longer to engage the corresponding end of the upper side rod of the grid. The pivot pin 174 is mounted at the upper end of a forked arm 178 of a bell crank fixed to pivot pin 179 and whose other arm 180 is connected by a link 182 to a lever 184 provided with a roller 186 riding on a cam 188 fixed on shaft 32. A spring 190 fastened to the lever and the machine frame serves to maintain the roller 186 against its cam. Stop screws 192 are threaded into lower projecting portions of the fingers, these serving to limit the action of the springs 176.

During indexing movement of the turret, the cam 188 serves to throw the fingers 164 and 166 far to the right of the carriers 22. This action is enhanced by reason of pins 194 threaded into the main central bearing casting of the machine, these pins serving, as the arm 178 is swung back in clockwise direction, to pivot the fingers against the action of the springs 176 to the positions shown in dotted lines in Fig. 6.

Figure 9:
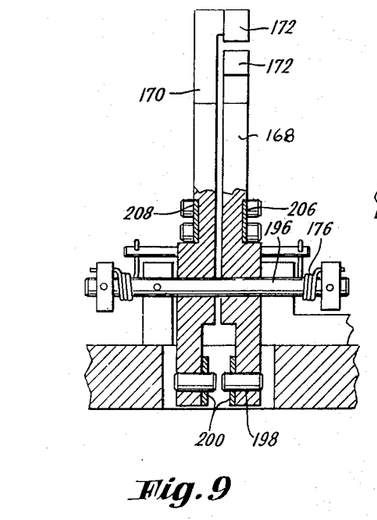
Fig. 9 is a section through the support for other fingers of the shifting means and looking in the direction of the arrows 9—9 in Fig. 6.

The cooperating fingers 168, 170, see Figs. 6 and 9, function at the opposite or front ends of the grid side rods. Like the fingers 164, 166, they are rotatably mounted on a pivot pin 196 and spring pressed toward the grid side rod ends by springs 176. The fingers 168 and 170 are prolonged down below the level of the pivot pin 196 and are provided at their lower ends with individual pins 198 riding in slots of links 200, said links being pivotally connected to an arm 202 fixed on the pivot pin 179 to which the bell crank 178, 180 is fixed. Normally, during grid side rod adjusting operation, the links 200 have no effect on the fingers 168 and 170; but when the fingers 164 and 166 are retracted for indexing movement of the turret, the left hand ends of the slots in links 200 engage the pins 198 and withdraw the fingers 168, 170 as well, to allow unrestricted movement of the carriers and grids. A frame mounted adjustable stop 204 limits approach movement of the fingers toward the center of the turret.

Means are provided to lock the fingers 168 and 170 against movement during thrusting operation on the fingers 164 and 166 so that the thrusting operation will become ineffective to shift the grid side rods. This takes place when the grid is racked sufficiently so that the grid laterals assume the desired angle with respect to the grid side rods. For this purpose, the fingers 168 and 170 are each provided with tail pieces 206 and 208 respectively, these being flat metal sheets suitably affixed to the fingers. The free ends of the tail pieces, see Fig. 1, are opposed to a stationary friction block 210 mounted on the machine and to friction pads 212, 213 mounted on a pair of bell crank levers 214 and 216, also pivoted on the frame. The lever 214 has an arm connected to the plunger 218 of a solenoid 220 which when energized will overcome the action of a brake releasing spring 222 and will set the brake including the block 210 and friction pad 212 via a lever, screw and spring arrangement shown at 224. Similarly the friction pad 213 and block 210 will cooperate to frictionally lock the tail piece 206 when the lever 216 is actuated by energization of a second solenoid 226. This second solenoid is provided with a plunger, spring, etc., in the same manner as the solenoid 220. The energization of the solenoids are controlled by contact rods 228 and 230, see Fig. 7, mounted in metal support blocks 232, each provided with a square tongue 234 and round rod 236 for suitable adjustable mounting in a fixed support 238, see Fig. 6, of insulative material. An adjusting screw 240 is provided for each of the blocks to thereby individually advance the contact rods toward the grid laterals and a metallic clamping screw 242 threaded through the support 238, is provided to engage the flat tongue 234. The screw also provides means whereby a conductor 244 may be led from a contact rod to its associated solenoid.

The other side of the solenoids lead to a suitable source of power and then to ground, the grid laterals being grounded through the machine. The rods 228 and 230 may be adjusted to contact with the last turn of the grid in any desired plane, preferably at the angle determined by the turns per inch of the grid. It should be understood that either rod 228 or 230 may be contacted first by a grid lateral depending on the angularity of the grid wires, but thrusting of the two fingers 164 and 166 against the side rods will move first one or the other until a portion of the last turn of the grid adjacent its corresponding side rod engages with its contact finger whereupon that side rod is locked against further movement, while the second side rod continues to move until a second portion of the last turn of the grid contacts the other of the contact fingers and then the second side rod is locked against further movement. After the side rods are rendered immovable further displacement of the forked arm 178 merely serves to rotate the fingers 164 and 166 about their common pivot 174 and against the action of springs 176.

The contours of the cams 188 and 105 are such that after the fingers 168 and 170 have been locked, the disc 24, see Fig. 2, is given another jog from B to C causing the roller 100 on the lever 96 which is at the "Position" station to move from the low point of inset 104 to the outer long portion of track 26 beneath the disc 24. This allows the jaws to again close on the racked grid preparatory to indexing the turret.

Next, the turret is indexed by the Geneva mechanism previously described with the designated roller 100 riding in the arcuate portion of the track so that during the travel of the carrier 22 in which the racked grid was positioned from "Position" to "Comb" stations, the carrier jaws remain closed. At the same time that the turret is advancing, the disc 24 is given a retrograde movement through the angle between C and A but since the roller is well within the circular area of track 26, the retrograde movement of the disc has no effect on the carrier jaws.

Figures 13, 15, 17, 18:
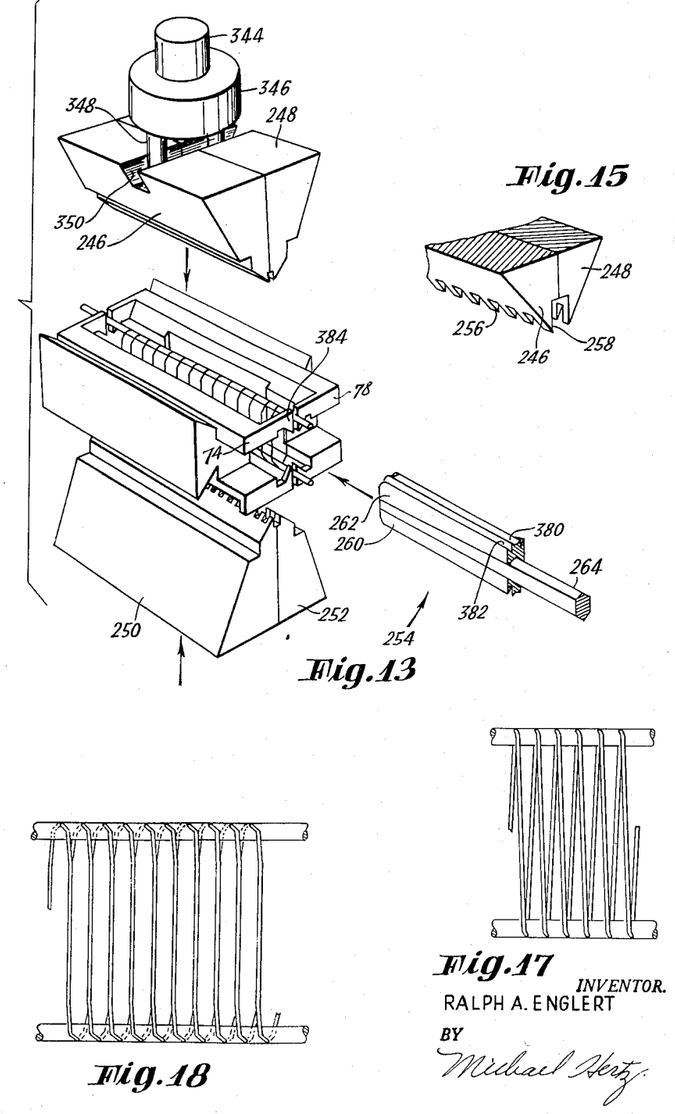
Fig. 13 is an exploded view of the grid stretching and combing mechanism shown in Fig. 10.
Fig. 15 is another view of a portion of a pair of grid combs.
Fig. 17 is a view of a fragmentary portion of a grid before processing in the machine disclosed herein.
Fig. 18 is a view of the same portion after processing.

Up to this time the grid substantially has the shape of the grid shown in Fig. 17 with the grid wire spirally wound about the grid side rods and lying within peened over portions of the rod. It is the function of the mechanism at the "Comb" station to reform the grid so that it has the parallel wire arrangement and stretched form of Fig. 18.

Figure 14:
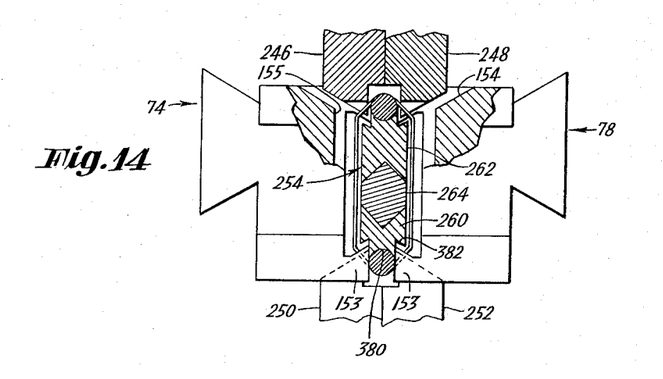
Fig. 14 is a view with parts broken away and parts in section showing the stretching and combing mechanism engaging a grid.

As the turret and its carrier come to "Comb" position, see Fig. 13, a pair of upper combs 246 and 248 start to move down toward the grid. When the turret has almost completely reached its index position a lower pair of combs 250 and 252 start to move up toward the grid. In the final rest position of the turret, the combs engage the grid in the manner shown in Fig. 14. Also as the turret is coming to its final position, see Figs. 10 and 13, a forming and stretching mandrel 254 starts to move into the grid and finally moves thereinto as shown in cross-section in Fig. 14. This mandrel has two stretching and forming bars 260 and 262 and an intermediate wedge bar 264. It will be noted that each of the combs has teeth 256 which are spaced to conform with the pitch winding on the grid and are of a depth about equal to the diameter of the grid side rods. Each comb by reason of the step or offset portion 258 in the comb will engage the grid laterals on the sides of the grid. If, while the bars 260 and 262 are within the grid but not wedged apart, and the combs of a pair are enmeshed with the grid laterals, the combs are shifted with respect to one another, the grid wires near a side rod and where the wires are peened in, will be bent in opposite directions to form kinks in the wires as will be apparent by comparing the grid fragments of Figs. 17 and 18. While the combs of a pair operative at the upper side rod are moving in their respective directions, the combs 250, 252 of the lower pair are also shifted in opposite directions, with the combs on the same face of the grid moving in opposite directions. As a result, the grid laterals are bent to run substantially perpendicularly to the grid side rods and the lateral wires of the grids on one face overlie the lateral wires of the grid on the other face.

After the grids have been combed as described, and while the combs are still engaged with the side rods and lateral wires, a wedge bar 264 is thrust in between bars 260 and 262 of the mandrel, thereby stretching the grid laterals, tightening the wires and giving them a permanent set. The carrier jaws, since they are resiliently pressed together yield sufficiently to allow the combing and stretching operations to take place. The nature of the drive to the comb supports is such as to allow for the slight separation of the upper from the lower combs as the grid is stretched.

After the grid is stretched, the wedge bar 264 is retracted to release stretching forces on the grid. Then the combs of each pair are backed slightly to release side pressure on the grid laterals, after which the pairs of combs are retracted away from the side rods to original start position and are further backed to bring the comb teeth of a pair in alignment. During this last motion, the mandrel sections are withdrawn and the turret now indexes with the carrier jaws closed until nearly at the "Unload" station, at which station the jaws are widely opened by reason of roller 100 reaching portion 102 of the track and the reshaped grid is released.

Figure 10:
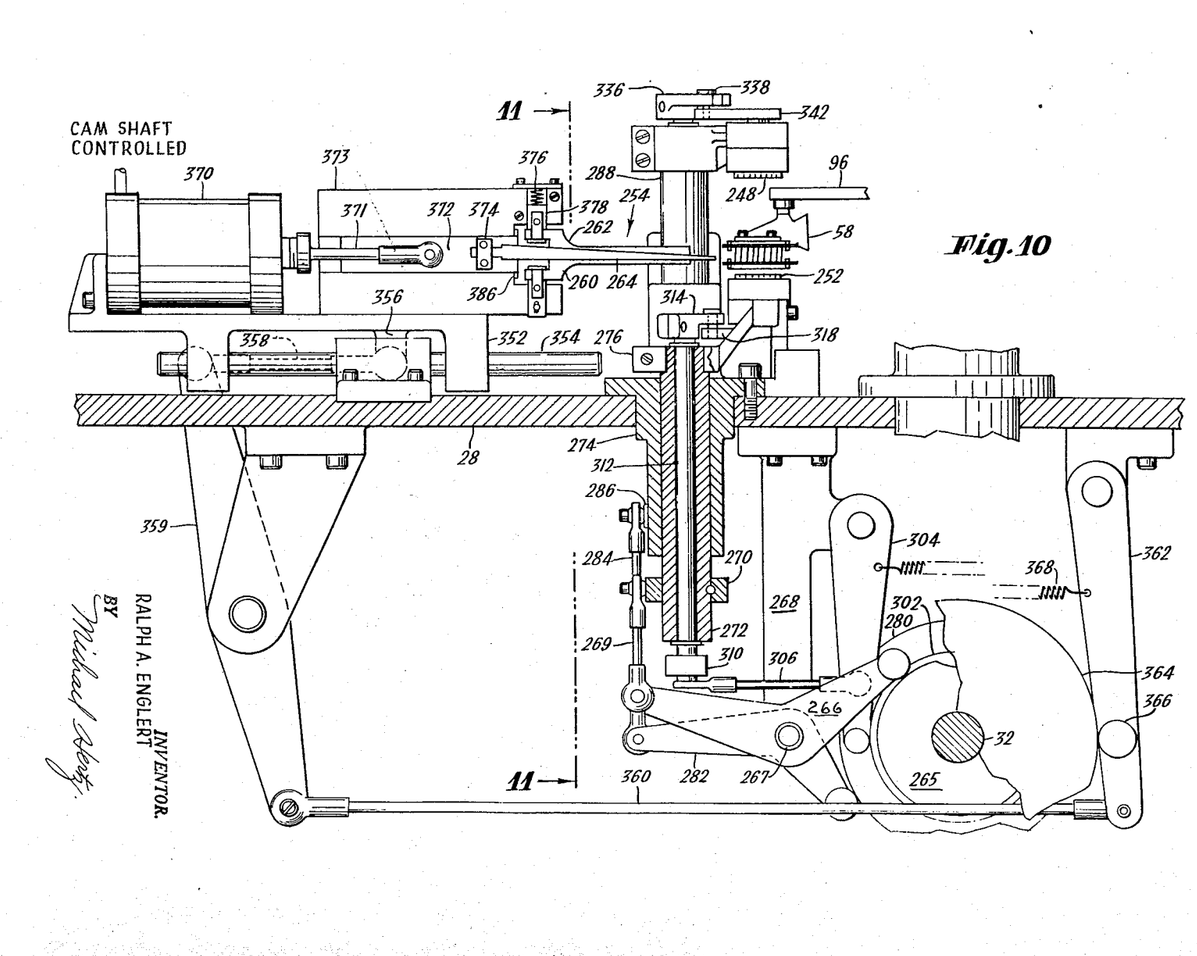
Fig. 10 is a section substantially on the line 10—10 of Fig. 1 showing means in the form of an expandible mandrel and oscillatable combs for stretching the grids and securing parallelism of the grid lateral wires.
Figures 11, 16:
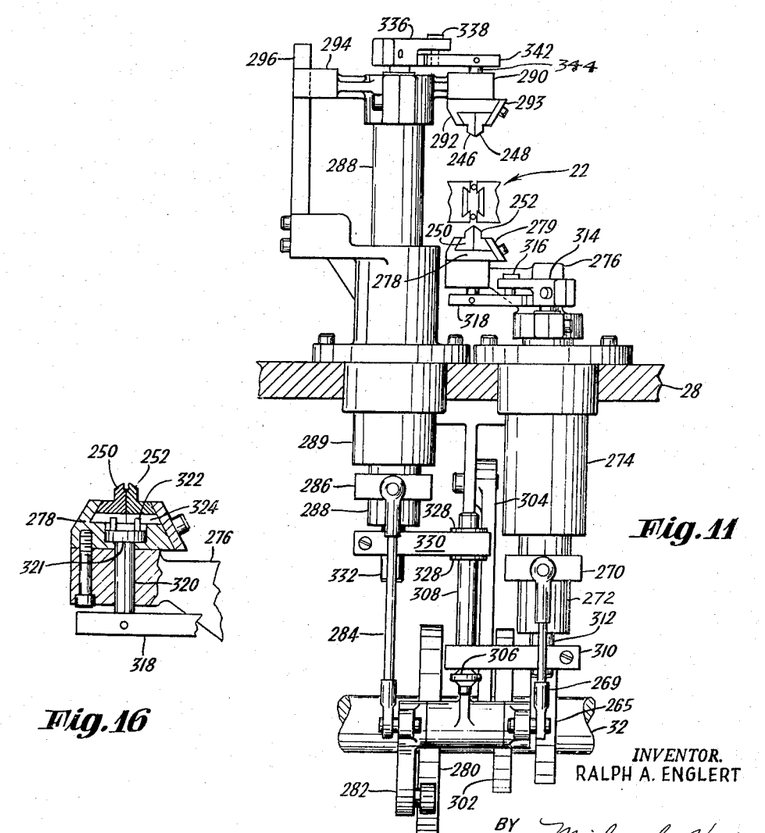
Fig. 11 is a view looking in the direction of the arrows 11—11 in Fig. 10.
Fig. 16 is a section through the bottom pair of combs shown in Fig. 13 and showing the means for effecting relative movement between the combs.

The mechanism for reshaping the grid, see Figs. 6, 10, and 11, includes the main drive shaft 32, on which is mounted the cam 265 for lifting the pair of lower combs 250 and 252, by means of a bell crank lever 266 pivoting about a pivot pin 267 mounted on the lower end of a depending bracket 268 fastened to the underside of the table 28. The one end of the bell crank lever has a follower riding on the cam 265 and the other end has a link 269 pivoted thereto, the upper end of the link being pivoted to a collar 270 fast with a hollow shaft 272 reciprocable in a long hub 274 fast with the table. Reciprocation of the hollow shaft 272 moves with it, see Fig. 11, a bracket 276 surmounted by a way 278 with one removable wall 279, in which way is oppositely reciprocable the pair of lower combs 250 and 252.

Operation of cam 265, therefore, lifts the lower comb up to the grid held by the carrier 22, and permits the parts to drop to lowered position.

Similarly, the upper pair of combs is lifted bodily by a cam 280 which operates on a bell crank lever 282 connected to a link 284 in turn connected to a collar 286 secured to a hollow vertically reciprocatable shaft 288 slidable in a table supported hub 289 and bearing at its upper end a bracket 290 supporting a downwardly facing way 292 with a removable wall 293 in which reciprocate in opposite directions the upper combs 246 and 248. The bracket 290 is guided against rotation in its upward and downward movement by a rear extension 294 straddling a rod 296 extending up from a part fixed to the hub 289. Similarly, see Fig. 1, the bracket 276 has an extension 298 straddling a rod 300 fixed with respect to the table. Another cam 302 is provided on the shaft for effecting reciprocation of all combs. This cam cooperates with a follower on the lower end of a spring influenced depending lever 304 pivoted on the bracket 268. Connected to a point intermediate the ends of the lever 304 is a link 306 connected to a vertical laterally translatable shaft 308. This translatable shaft finds bearing in one arm 310 fastened to the lower end of a vertical oscillatable shaft 312 bearing within the hollow shaft 272. The upper end of the shaft has fastened to it an arm 314 carrying a pin 316 riding in a slot of an articulated arm 318, said last arm, see Fig. 16, being pinned to an oscillatable stub shaft 320 bearing in the vertically movable bracket 276 and way 278. The upper end of the stub shaft has a disc 321 with two eccentric pins 322 riding in transverse slots 324 in the combs 250 and 252. As the shaft 320 is oscillated, the combs 250 and 252 will slide in opposite directions in the way 278.

Figure 12:
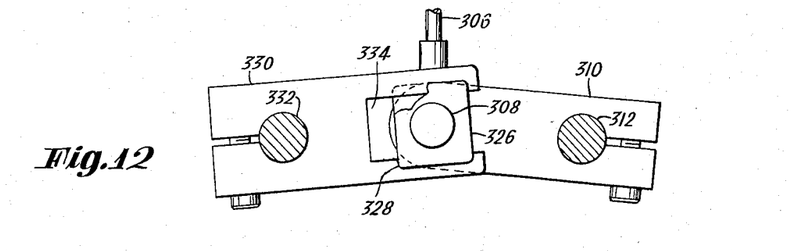
Fig. 12 is a view of mechanism utilized to oscillate the grid combs.

The upper combs are reciprocated by mechanism similar to that just described. On the upper end of the laterally translatable shaft 308, see Fig. 12, there is a journal box 326 provided with flanges 328, engageable with the upper and lower surfaces of an arm 330 fast on a shaft 332. To permit non-binding action of the arms 310, 330, as the shaft 308 is moved laterally, the arm 330 is provided with a slot 334, the edges of which the flanges 328 straddle, for sliding motion of the journal box. The shaft 332 extends upwardly through the hollow vertically reciprocatable shaft 288 and at its upper end, see Fig. 1, fixedly carries an arm 336 carrying a pin 338 riding in a slot 340 at the end of an arm 342 fixed to a stub shaft 344, journaled in the bracket 290 and way 292 in a manner similar to the journaling of the stub shaft 320 pertaining to the oscillation of the lower combs. The stub shaft 344, see Fig. 13, at its lower end, is provided with a disc 346 provided with eccentrically mounted pins 348 riding in transverse slots 350 in the upper combs 246 and 248. Thus rotation of cam 302 operating through lever 304, link 306, translatable shaft 308, the two arms 310 and 330, the two vertical oscillatable shafts 312 and 332 and through the operating mechanisms at the upper ends of the oscillatable shafts, causes reciprocating movements of both sets of combs with the comb 246 movable in an opposite direction to comb 250 and with comb 248 moving in an opposite direction to comb 252. As a result, the combed grid has the appearance of Fig. 18 with the grid lateral wires so bent that they are substantially perpendicular to the grid side rods to points very close to the side rods.

It will be remembers that after the combs have been operated to reshape the lateral wires and while the combs are still in engagement with the wires, the former and spreader mandrel 254 is operative to stretch the grid. When the combs are in engagement with the grids the bars 260 and 262 of the mandrel are within the grid and the wedge bar 264 is about to be driven in. The mandrel 254, see Fig. 10, is mounted on a carriage 352 slidable on a pair of parallel rods 354, one behind the other in a horizontal plane, and moved on the rods by a downwardly projecting lug 356 on the carriage, a link 358 pivoted to the lug and to the upper end of a lever 359 pivoted to a bracket on the frame, a second long link 360 pivoted to the lower end of the lever 359 at one end and to another frame pivoted lever 362 at the other end and by a cam 364 on shaft 32 operative on a follower 366 on the lever 362. A spring 368 tensioned between the lever 362 and the frame tends to move the mandrel into the grid. When the mandrel is within the grid a cam shaft operated valve (not shown) controls the flow of pressure to a fluid motor 370 which through a piston rod 371 and connected slide 372 operative in ways 373 operates the wedge bar 264. The wedge bar is clamped to the slide by any suitable means such as the strap 374. Each mandrel bar 260, 262 is resiliently held against the wedge bar in all positions of the wedge bar by a spring 376, within a bore in a way 373, the spring bearing against a block 378 suitably rigidly secured to the mandrel bar. Each of the mandrel bars 260 and 262, see Fig. 13, has a concavity 380 on its outer edge to snugly embrace the round faces of the grid side rods and recessed portions 382 to pass by the pointed ends 384 on jaws 74 and 78. The bar 362 is tapered to conform with the tapered wedge bar 264 while the bar 260 has no taper. To better hold the wedge bar in position, it is made hexagonal in cross-section, the wedge bar engaging surfaces of the bars 260 and 262 being shaped to conform therewith. Ears 386 on the slide, see Fig. 10, movable to positions where they engage either the ways 373 or the rear ends of the bars 262 and 264, serve to limit the spreading action of the bar 264.

As stated heretofore, the spreading action of the mandrel takes place while the teeth of the combs are still engaged with the wires so that even while the grid side rods are forced apart and the grid lateral wires are given their permanent set and shape about the mandrel, the wires are still kept their proper distance apart and are still maintained substantially perpendicular to the side rods. After the wedge bar 264 has been withdrawn, the combs back off from the wires to allow separating movement of the combs without disturbance of the grid wires. Toward the end of the separating movement of the combs, the comb sections are restored to their normal position, shown in Fig. 13.

After the mandrel and the combs have been withdrawn, the turret again indexes transferring the combed grid to the "Unload" station. Just when the grid reaches the unloading station the jaws 74 and 78 are opened wide by initial operation of the disc 24 in moving through the angle from A to B, and the grid drops out from the carrier. The cycle of operations performed by the machine is now completed and ready to be repeated.

It should be understood that although specific tools are shown for handling the grid, other tools may be substituted for a different size or shape of grid, all tool holding portions being made removable to provide for interchangeability of tools.

In assembly of a mount for an electron tube, No. 1 and No. 2 grids made by machines of the character described above are dropped onto the bottom mica or other insulating support until the bottom laterals abut the mica. The other components of the mount are assembled as usual. Because of the treatment of the grids by the machine of the invention, when the bottom grid laterals abut the mica as described above, all of the laterals must of necessity be horizontally aligned and no adjustment of parts after mount assembly is necessary to secure this alignment.

Having thus described the invention, what is claimed is:

1. In a grid processing machine, a conveyor, grid carriers mounted on the conveyor, means operative while a carrier is in one position of the traverse with the conveyor to load a grid thereon, means operative when the carrier is at a second position to rack the grid within the carrier, means operative when the carrier is at a third position and while the grid is held so racked to stretch and reform the grid, and means operative when the carrier is at a fourth position to unload the grid from its carrier, all of said means being driven by a common mechanism.

2. A carrier for a grid comprising a horizontal guideway, a slide in said guideway, a jaw block pivotally mounted on said slide on a vertical pivot, a grid engaging jaw carried by said block, a second grid engaging jaw cooperative with the first jaw to hold a grid, a second block supporting the second jaw, means pivotally mounting the second block on the carrier by means of a horizontal pin and means biasing the slide with its first jaw in a direction toward the second jaw.

3. A turret, a number of spaced carriers on said turret, each carrier including a fixed jaw support and a movable jaw support biased toward said fixed jaw support, means for indexing said turret, means for moving said movable jaw support away from said other support comprising a lever pivotally mounted on the turret engaging the movable jaw support, and an oscillatable cam mounted on a fixed axis engaging the other end of said lever.

4. A turret having a horizontal surface on which is mounted a plurality of spaced carriers, each carrier including a fixed jaw support and a movable jaw support biased for movement in a horizontal plane toward said fixed jaw support, means for indexing the turret, means for shifting each of said movable supports away from the companion supports comprising a lever pivoted on the turret for movement in a horizontal plane, means on one end of the lever bearing against a portion of the movable support, an oscillatable disc above and parallel to the horizontal surface of the turret, means synchronized with the turret indexing means to oscillate the disc, a cam track in the lower face of the disc, and a follower in the cam track connected to the other end of the lever.

5. In a grid processing machine, a turret, means for indexing the turret, carriers spaced about the periphery of the turret and indexible with the turret, each carrier comprising a pair of jaws to engage a grid at a loading station, a cradle at said loading station for supporting a grid to be grasped by the jaws, and adjacent the periphery of the turret, said cradle being movable vertically in between the jaws on completion of indexing movement of the turret and movable downwardly out of the path of the loaded jaws on initiation of turret indexing movement and means for moving the cradle, and for moving the turret and the jaws.

6. In a grid processing machine, a turret, means for indexing the turret, carriers spaced about the periphery of the turret and indexible with the turret, each carrier comprising a pair of jaws to engage a grid at a loading station, locking means for arresting the turret at said loading station, a cradle at said loading station for supporting a grid to be grasped by the jaws, and adjacent the periphery of the turret, said cradle being movable vertically in between the jaws on completion of indexing movement of the turret and movable downwardly out of the path of the loaded jaws on initiation of turret indexing movement and means coupled for concurrent movement with said locking means for moving the cradle, and for moving the turret and the jaws.

7. In a reshaping machine for a grid having side rods and grid laterals stretched therebetween, a conveyor having a number of grid carriers, each carrier comprising a pair of relatively movable jaws adapted to engage the side rods of a grid, means for loading a grid between the jaws, means to index the conveyor to a grid racking station, means at said station to support the bottom of the grid and simultaneously remove the pressure of said jaws on the side rods, means while at said station to shift the side rods longitudinally with respect to each other to attain a predetermined angularity of the grid laterals, means to subsequently close the jaws on the side rods prior to further indexing of the turret, and means at at least one other station to further process the racked grid.

8. In a reshaping machine for grids having grid side rods and grid laterals spanning the side rods, means for longitudinally shifting at least one of the side rods with respect to each other to secure predetermined angularity of the grid laterals with respect to the side rods comprising a pair of fingers for a rod, one finger thrusting against one end of the rod to shift the same longitudinally and the other finger being thrust and shifted by the other end of the rod, and means sensitive to the position of a grid lateral to restrain the second finger against movement, thereby rendering the thrust of the first finger ineffective to further move the rod.

9. In a grid reshaping machine for grids having grid side rods and grid lateral wires spanning the side rods, means for shifting the side rods longitudinally to secure predetermined angularity of the grid lateral wires with respect to the side rods comprising pairs of fingers for each rod, one finger of a pair thrusting against the end of a rod and the other finger of that pair being moved by reason of the same rod thrusting against the same, and two means having sensing elements situated close to opposite ends of a grid lateral wire and sensitive to the position assumed by a grid lateral wire for blocking the movement of said second fingers, respectively.

10. A turret, carriers spaced about the periphery of the turret, said carriers having grid grasping jaws wherein the grid comprises parallel side rods with grid lateral wires spanning the space between the rods, means for indexing the turret, means for opening the jaws to release a grid as the turret arrives at a grid reshaping station, means at said station to support the grid when released, means for shifting the side rods longitudinally to secure predetermined angularity of the grid lateral wires with respect to the side rods comprising pairs of fingers for each rod, one finger of a pair thrusting against the end of a rod and the other finger of that pair being moved by reason of the same rod thrusting against the same, and two means having sensing elements situated close to opposite ends of a grid lateral wire and sensitive to the position assumed by a grid lateral wire; means for blocking the movement of said second fingers, respectively, and means controlled by said sensing elements when rendered sensitive for effecting the operation of said blocking means.

11. In a machine for reshaping grids having parallel side rods and grid lateral wires spanning the rods, a carrier holding the grid side rods, a comb engaging one of the side rods, the combs having teeth interfitting the turns of the grid, a second comb engaging the other of the side rods, on the same side of the grid and having teeth interfitting the wires of the grid, and means for moving the combs in opposite directions.

12. In a machine for reshaping grids having parallel side rods and spirally wound grid lateral wires spanning the rods, a carrier holding the side rods, a pair of combs engaging one of the side rods with one comb on one side of the rod and partially over the top thereof and with the other comb on the other side of the rod and partially over the top thereof, the teeth of the combs interfitting the lateral wires, means for moving the combs in opposite directions to bend the wires, a second pair of combs engaging the other side rod with one comb on one side of the second side rod and partially underneath the same and the other comb on the other side of the second side rod and partially underneath the same, with the teeth of the combs interfitting the lateral wires, and means for moving the second pair of combs in opposite directions, with the combs on the same side of the grid moving in opposite sense.

13. In a machine for reshaping grids having parallel side rods and spirally wound grid lateral wires spanning the rods, a carrier holding the side rods, a pair of combs engaging one of the side rods with one comb on one side of the rod and partially over the top thereof and with the other comb on the other side of the rod and partially over the top thereof, the teeth of the combs interfitting the lateral wires, means for moving the combs in opposite directions to bend the wires, a second pair of combs engaging the other side rod with one comb on one side of the side rod and partially underneath the same and the other comb on the other side of the second side rod and partially underneath the same, with the teeth of the combs interfitting the lateral wires, means for moving the second pair of combs in opposite directions, with the combs on the same side of the grid moving to opposite sense, a mandrel insertable within the grid, and means operative to expand the mandrel after the grid combing operation but while the comb teeth are still engaged with the wires.

14. In a machine for reshaping grids having parallel side rods and spirally wound grid lateral wires spanning the rods, a carrier holding the side rods, a pair of combs engaging one of the side rods with one comb on one side of the rod and partially over the top thereof and with the other comb on the other side of the rod and partially over the top thereof, the teeth of the combs interfitting the lateral wires, means for moving the combs in opposite directions to bend the wires, a second pair of combs engaging the other side rod with one comb on one side of the side rod and partially underneath the same and the other comb on the other side of the second side rod and partially underneath the same, with the teeth of the combs interfitting the lateral wires, means for moving the second pair of combs in opposite directions, with the combs on the same side of the grid moving to opposite sense, a mandrel insertable within the grid, means operative to expand the mandrel after the grid combing operation but while the comb teeth are still engaged with the wires, means for contacting the mandrel and withdrawing the same from the grid, means for backing off the comb teeth from the grid lateral wires and for withdrawing the combs from the side rods, and means for releasing the reshaped grids from between the jaws.

15. A machine for reshaping and stretching grids having parallel side rods and grid wires spanning the rods, said machine comprising a grid carrier movable through a plurality of stations, said carrier having movable jaws, means operative at one station to load a grid into the carrier and to close the carrier jaws on the grid, means operative at a second station to release the grid from the jaws and to support the grid from beneath, means operative at said second station to shift the side rods longitudinally with respect to one another and to bring a spanning wire to a definite position with respect to the carrier, means operative at said second station to again close the jaws on the adjusted grid, means operative at a third station to reshape the spanning wires to bring them into a definite angular relationship to the side rods and to stretch the side rods apart while the wires are so held, and means operative at a fourth station to open the jaws to release a reshaped and stretched grid from the carrier, all of said means being driven by a common mechanism.

16. A machine for reshaping and stretching grids which have grid side rods and grid lateral wires spanning the side rods, said machine comprising a turret indexible about a vertical axis, means for indexing the turret, grid carriers provided with movable jaws biased toward fixed jaws, with the carriers mounted in spaced relation on the periphery of the turret, a horizontal cam disc mounted above the turret, said disc having a confined cam track in its lower face, means for oscillating said disc, said turret having pivotally mounted on its upper surface a series of levers, one for each movable jaw and having one end of each lever engageable with a movable jaw to shift the same in one direction, the other ends of the levers being in engagement with the cam track in the disc.

17. In a machine for reshaping a grid having parallel side rods and grid lateral wires spirally wound about the side rods, said machine comprising a pair of combs engaging a side rod with the teeth of the combs fitting in between the wires adjacent to and on each side of the side rod, a second pair of combs similarly engaging the second side rod and wires adjacent thereto, each pair of combs being provided with moving means to effect reciprocation of the combs relative to one another, said means including an oscillatable shaft horizontally connected to each pair of combs to effect oscillation of the combs with respect to one another, an arm fixed on one shaft, a second slotted arm fixed on the second shaft, said second arm overlying and partially overlapping the first arm, a third shaft mounted in one arm and slidably related to the second slotted arm, and means for laterally bodily shifting said third shaft thereby effecting simultaneous reciprocation of all combs.

18. Means for effecting shifting of side rods of a grid having side rods with a spirally wound wire thereabout and for bringing the turns of said wire into definite angular relationship to the side rods comprising a support on which the grid rests, a finger engaging an end of a side rod, means for moving said finger to thrust the side rod longitudinally, a second finger engaged by the opposite end of the rod and thrust backward by reason of longitudinal shift of the rod, a normally inoperative brake cooperative with said second finger, an electrical contact rod close to the side rod and in the path of movement of the wire wound about the side rod, electromagnetic means electrically connected to the contact rod to render the brake effective on contact of the contact rod with the wire; and a complementary pair of fingers, brake, electromagnetic means and contact rod for the other of the side rods of said grid whereby the grid will be racked to bring the grid wire in definite angular relationship to the side rods and the grid will be shifted to bring the wound wires in definite positional relationship with respect to the support for the grid.

19. Means for effecting shifting of side rods of a grid having side rods with a spirally wound wire thereabout and for bringing the turns of said wire into definite angular relationship to the side rods comprising a support on which the grid rests, a finger engaging an end of a side rod, means for moving said finger to thrust the side rod longitudinally, a second finger engaged by the opposite end of the rod and thrust backward by reason of longitudinal shift of the rod, a normally inoperative brake cooperative with said second finger, an electrical contact rod close to the side rod and in the path of movement of the wire wound about the side rod, electromagnetic means to render the brake effective on contact of the contact rod with the wire; and a complementary pair of fingers, brake and contact rod for the other of the side rods of said grid whereby the grid will be racked to bring the grid wire in definite angular relationship to the side rods and the grid will be shifted to bring the wound wires in definite positional relationship with respect to the support for the grid; a conveyor, a carrier on said conveyor, grid clamping jaws on said carrier, means to clamp said jaws on the repositioned grid, means to move the conveyor to a grid combing station, toothed means at said station, means to move the teeth of said means into the prepositioned winding of the grid, the teeth being arranged to lie between successive turns of the wire, and means to shift the so positioned toothed means longitudinally of the grid side rods to effect a bending of the turns of the wire.

20. In a reshaping machine for grids having grid side rods and grid laterals spanning the side rods, means underlying a grid for supporting the same, means for longitudinally shifting at least one of the side rods with respect to the other to secure predetermined angularity of the grid laterals with respect to the side rods comprising a pair of fingers for a rod, one finger thrusting against one end of the rod to shift the same longitudinally and the other finger being thrust and shifted by the other end of the rod, and means sensitive to the position of a grid lateral to restrain the second finger against movement, thereby rendering the thrust of the first finger ineffective to further move the rod.

21. In a grid reshaping machine for grids having grid side rods and grid lateral wires spanning the side rods, means underlying a grid for supporting the same, means for shifting the side rods longitudinally to secure predetermined angularity of the grid lateral wires with respect to the side rods comprising pairs of fingers for each rod, one finger of a pair thrusting against the end of a rod and the other finger of that pair being moved by reason of the same rod thrusting against the same, and two means having sensing elements situated close to opposite ends of a grid lateral wire and sensitive to the position assumed by a grid lateral wire for blocking the movement of said second fingers, respectively.

22. In a machine for reshaping a grid having parallel side rods and grid lateral wires spirally wound about the side rods, said machine including a carrier for holding the side rods; a pair of combs engaging a side rod with the teeth of the combs fitting in between the wires adjacent to and on each side of the side rod, a second pair of combs similarly engaging the second side rod and wires adjacent thereto, each pair of combs being provided with moving means to effect reciprocation of the combs relative to one another, said means including an oscillatable shaft horizontally connected to each pair of combs to effect oscillation of the combs with respect to one another, an arm fixed on one shaft, a second slotted arm fixed on the second shaft, said second arm overlying and partially overlapping the first arm, a third shaft mounted in one arm and slidably related to the second slotted arm, and means for laterally bodily shifting said third shaft thereby effecting simultaneous reciprocation of all combs.

23. In a machine for reshaping grids having parallel side rods and spirally wound grid lateral wires spanning the rods, a carrier holding the side rods, a pair of combs engaging one of the side rods with one comb on one side of the rod and partially over the top thereof and with the other comb on the other side of the rod and partially over the top thereof, the teeth of the combs interfitting the lateral wires, means for moving the combs in opposite directions to bend the wires, a second pair of combs engaging the other side rod with one comb on one side of the second side rod and partially underneath the same and the other comb on the other side of the second side rod and partially underneath the same, with the teeth of the combs interfitting the lateral wires, and means for moving the second pair of combs in opposite directions, with the combs on the same side of the grid moving in opposite sense, and common drive means to operate both pairs of combs.

24. In a machine for reshaping grids having parallel side rods and spirally wound grid lateral wires spanning the rods, a carrier holding the side rods, a pair of combs engaging one of the side rods with one comb on one side of the rod and partially over the top thereof and with the other comb on the other side of the rod and partially over the top thereof, the teeth of the combs interfitting the lateral wires, means for moving the combs in opposite directions to bend the wires, a second pair of combs engaging the other side rod with one comb on one side of the side rod and partially underneath the same and the other comb on the other side of the second side rod and partially underneath the same, with the teeth of the combs interfitting the lateral wires, means for moving the second pair of combs in opposite directions, with the combs on the same side of the grid moving to opposite sense, a mandrel insertable within the grid, and means operative to expand the mandrel after the grid combing operation but while the comb teeth are still engaged with the wires and common drive means to operate both pairs of combs.

25. In a machine for reshaping grids having parallel side rods and spirally wound grid lateral wires spanning the rods, a carrier holding the side rods, a pair of combs engaging one of the side rods with one comb on one side of the rod and partially over the top thereof and with the other comb on the other side of the rod and partially over the top thereof, the teeth of the combs interfitting the lateral wires, means for moving the combs in opposite directions to bend the wires, a second pair of combs engaging the other side rod with one comb on one side of the side rod and partially underneath the same and the other comb on the other side of the second side rod and partially underneath the same, with the teeth of the combs interfitting the lateral wires, means for moving the second pair of combs in opposite directions, with the combs on the same side of the grid moving to opposite sense, a mandrel insertable within the grid, means operative to expand the mandrel after the grid combing operation but while the comb teeth are still engaged with the wires, means for contacting the mandrel and withdrawing the same from the grid, means for backing off the comb teeth from the grid lateral wires and for withdrawing the combs from the side rods, and means for releasing the reshaped grids from between the jaws and common drive means to operate both pairs of combs.

26. Mechanism for reshaping a formed grid which is provided with side rods and a wire wound spirally around the rods and fastened thereto, said mechanism comprising combs simultaneously engaging the individual turns of the wires on both sides of the rod of each side rod and mechanism for shifting the combs longitudinally of the rods with the direction of shift of one comb on one side of one side rod opposite to the direction of shift of a comb on the corresponding side of the other side rod and the direction of shift of combs on both sides of the side rods with respect to each side rod being in opposite directions.

27. Mechanism for reshaping a formed grid which is provided with side rods and a wire wound spirally around the rods and fastened thereto, said mechanism comprising combs simultaneously engaging the individual turns of the wires on both sides of the rod of each side rod and mechanism for shifting the combs longitudinally of the rods with the direction of shift of one comb on one side of one side rod opposite to the direction of shift of a comb on the corresponding side of the other side rod and the direction of shift of combs on both sides of the side rods with respect to each side rod being in opposite directions, and mechanism for moving the side rods away from each other while the wires are still engaged by the combs.

References Cited in the file of this patent

UNITED STATES PATENTS

| | | |
|---|---|---|
| 1,434,836 | Neal | Nov. 7, 1922 |
| 1,901,087 | Dalheimer | Mar. 14, 1933 |
| 1,920,630 | Conn | Aug. 1, 1933 |
| 2,000,163 | Clark | May 7, 1935 |
| 2,297,950 | Flaws | Oct. 6, 1942 |
| 2,397,233 | Bingley | Mar. 26, 1946 |
| 2,586,629 | Englert | Feb. 19, 1952 |
| 2,680,208 | Gehrke | June 1, 1954 |
| 2,719,543 | Maurer | Oct. 4, 1955 |
| 2,783,783 | Armstrong | Mar. 5, 1957 |
| 2,820,487 | Bahm | Jan. 21, 1958 |
| 2,837,126 | Hughes | June 3, 1958 |
| 2,853,104 | Johnson | Sept. 23, 1958 |